(12) United States Patent
Kennedy et al.

(10) Patent No.: US 10,212,687 B2
(45) Date of Patent: Feb. 19, 2019

(54) SYSTEM AND METHOD FOR ROBUST NAVIGATION AND GEOLOCATION USING MEASUREMENTS OF OPPORTUNITY

(71) Applicant: Echo Ridge LLC, Sterling, VA (US)

(72) Inventors: Joseph P. Kennedy, Great Falls, VA (US); John P. Carlson, Dulles, VA (US)

(73) Assignee: Echo Ridge LLC, Sterling, VA (US)

( * ) Notice: Subject to any disclaimer, the term of this patent is extended or adjusted under 35 U.S.C. 154(b) by 0 days.

(21) Appl. No.: 14/864,187

(22) Filed: Sep. 24, 2015

(65) Prior Publication Data

US 2016/0014713 A1 Jan. 14, 2016

Related U.S. Application Data

(63) Continuation-in-part of application No. 13/250,134, filed on Sep. 30, 2011.

(60) Provisional application No. 61/404,196, filed on Sep. 30, 2010.

(51) Int. Cl.
*H04W 64/00* (2009.01)
*G01S 5/06* (2006.01)
*G01S 5/02* (2010.01)
*G01S 19/46* (2010.01)
*G01S 5/14* (2006.01)
*G01C 5/06* (2006.01)

(52) U.S. Cl.
CPC ............. *H04W 64/00* (2013.01); *G01C 5/06* (2013.01); *G01S 5/0242* (2013.01); *G01S 5/0252* (2013.01); *G01S 5/0257* (2013.01); *G01S 5/0289* (2013.01); *G01S 5/06* (2013.01); *G01S 5/14* (2013.01); *G01S 19/46* (2013.01)

(58) Field of Classification Search
CPC ................................. G01C 5/06; G01S 19/45
USPC ......................................... 342/123, 125, 140
See application file for complete search history.

(56) References Cited

U.S. PATENT DOCUMENTS

| | | | |
|---|---|---|---|
| 5,652,592 A * | 7/1997 | Sanderford | G01C 5/06 342/120 |
| 5,794,128 A | 8/1998 | Brockel et al. | |
| 5,917,449 A * | 6/1999 | Sanderford | G01S 1/022 342/457 |
| 6,094,168 A | 7/2000 | Duffett-Smith et al. | |
| 6,275,705 B1 | 8/2001 | Drane et al. | |
| 6,393,292 B1 | 5/2002 | Lin | |
| 6,492,945 B2 | 12/2002 | Counselman, III et al. | |
| 6,518,918 B1 * | 2/2003 | Vannucci | G01C 5/06 137/81.1 |
| 6,522,890 B2 * | 2/2003 | Drane | G01S 1/024 342/357.31 |

(Continued)

FOREIGN PATENT DOCUMENTS

| | | |
|---|---|---|
| WO | 2007113086 A1 | 10/2007 |
| WO | 2008119635 A1 | 10/2008 |
| WO | 2009112293 A1 | 9/2009 |

OTHER PUBLICATIONS

Derek Kurth, "Range-Only Robot Localization and SLAM with Radio", Robotics Institute, Carnegie Mellon University, May 2004, 60 pgs.

*Primary Examiner* — Marcus E Windrich
(74) *Attorney, Agent, or Firm* — Duane Morris LLP

(57) ABSTRACT

A system and method to opportunistically capture and use measurements of barometric readings from a plurality of mobile agents to determine the elevational position of one of the mobile agents.

16 Claims, 10 Drawing Sheets

(56) References Cited

U.S. PATENT DOCUMENTS

| | | | |
|---|---|---|---|
| 6,571,082 B1 | 5/2003 | Rahman et al. | |
| 6,865,395 B2 * | 3/2005 | Riley | G01S 5/0252 342/464 |
| 6,970,795 B1 * | 11/2005 | Burgett | G01C 5/06 342/357.25 |
| 6,978,131 B1 | 12/2005 | Lee | |
| 7,019,693 B2 * | 3/2006 | Spirito | G01S 5/02 342/462 |
| 7,035,650 B1 | 4/2006 | Moskowitz et al. | |
| 7,171,345 B2 | 1/2007 | Mocek | |
| 7,398,086 B2 | 7/2008 | Morgand et al. | |
| 7,620,368 B2 | 11/2009 | Wang et al. | |
| 7,750,848 B2 | 7/2010 | Normark et al. | |
| 7,773,995 B2 | 8/2010 | Rappaport et al. | |
| 8,000,656 B1 | 8/2011 | Jiao et al. | |
| 8,018,383 B1 | 9/2011 | Schantz et al. | |
| 8,086,187 B1 | 12/2011 | Davis et al. | |
| 8,106,818 B2 | 1/2012 | Bhattacharya et al. | |
| 8,126,453 B2 | 2/2012 | Wang | |
| 8,188,912 B1 * | 5/2012 | Weisenburger | G01S 19/48 342/357.24 |
| 8,229,416 B2 | 7/2012 | Akman et al. | |
| 8,255,160 B2 | 8/2012 | Duffett-Smith et al. | |
| 8,270,910 B2 | 9/2012 | Picard | |
| 8,332,198 B1 | 12/2012 | Barclay et al. | |
| 8,339,142 B2 | 12/2012 | Oowada | |
| 8,339,310 B2 | 12/2012 | Mizuochi et al. | |
| 8,437,772 B2 | 5/2013 | Moeglein et al. | |
| 8,451,763 B2 | 5/2013 | Brundage et al. | |
| 8,843,077 B2 | 9/2014 | Haran | |
| 2002/0160717 A1 | 10/2002 | Persson et al. | |
| 2004/0008138 A1 | 1/2004 | Hockley et al. | |
| 2004/0033808 A1 * | 2/2004 | Rorabaugh | G01S 5/0289 455/456.1 |
| 2005/0085223 A1 | 4/2005 | Liu | |
| 2005/0200525 A1 | 9/2005 | Duffett-Smith et al. | |
| 2005/0260962 A1 | 11/2005 | Nazrul et al. | |
| 2006/0094365 A1 | 5/2006 | Inogai et al. | |
| 2006/0128315 A1 | 6/2006 | Belcea | |
| 2006/0148429 A1 | 7/2006 | Inogai et al. | |
| 2006/0174162 A1 | 8/2006 | Varadarajan et al. | |
| 2006/0229018 A1 | 10/2006 | Mlinarsky et al. | |
| 2006/0229020 A1 | 10/2006 | Mlinarsky et al. | |
| 2006/0240839 A1 | 10/2006 | Chen et al. | |
| 2006/0287824 A1 * | 12/2006 | Lin | G01C 21/165 701/472 |
| 2007/0019769 A1 | 1/2007 | Green et al. | |
| 2007/0072552 A1 | 3/2007 | Jonsson et al. | |
| 2007/0127559 A1 | 6/2007 | Chang | |
| 2007/0223571 A1 | 9/2007 | Viss | |
| 2008/0026748 A1 | 1/2008 | Alexander et al. | |
| 2008/0057873 A1 | 3/2008 | Huang et al. | |
| 2008/0084951 A1 | 4/2008 | Chen et al. | |
| 2008/0274753 A1 | 11/2008 | Attar et al. | |
| 2009/0094492 A1 | 4/2009 | Music et al. | |
| 2009/0113245 A1 | 4/2009 | Conner | |
| 2009/0213828 A1 | 8/2009 | Brundage et al. | |
| 2009/0233621 A1 | 9/2009 | Rhoads et al. | |
| 2009/0281729 A1 | 11/2009 | Duffett-Smith et al. | |
| 2010/0049469 A1 * | 2/2010 | Wirola | G01C 5/06 702/150 |
| 2010/0062722 A1 | 3/2010 | Dykema et al. | |
| 2010/0099361 A1 | 4/2010 | Lundstrom et al. | |
| 2010/0204916 A1 * | 8/2010 | Garin | G01S 19/22 701/532 |
| 2011/0057836 A1 * | 3/2011 | Ische | G01S 5/0009 342/357.43 |
| 2011/0065457 A1 | 3/2011 | Moeglein et al. | |
| 2011/0109504 A1 | 5/2011 | Ellis | |
| 2011/0124295 A1 | 5/2011 | Mahjoubi Amine et al. | |
| 2011/0136457 A1 | 6/2011 | Yu | |
| 2011/0223869 A1 | 9/2011 | Harteneck | |
| 2011/0234454 A1 | 9/2011 | Mathews et al. | |
| 2011/0287721 A1 | 11/2011 | Haran | |
| 2011/0306306 A1 | 12/2011 | Reed | |
| 2012/0071107 A1 | 3/2012 | Falck et al. | |
| 2012/0225624 A1 | 9/2012 | Kyosti et al. | |
| 2013/0029608 A1 | 1/2013 | Kuo et al. | |
| 2013/0231060 A1 | 9/2013 | Ozaki et al. | |
| 2014/0051363 A1 | 2/2014 | Kennedy et al. | |

\* cited by examiner

SYSTEM AND METHOD FOR ROBUST NAVIGATION AND GEOLOCATION USING MEASUREMENTS OF OPPORTUNITY

The present application is a continuation-in-part of U.S. application Ser. No. 13/250,134 titles "System and Method for Robust Navigation and Geolocation Using Measurements of Opportunity", filed Sep. 30, 2011, which claims the benefit of U.S. Provisional Pat. App. No. 61/404,196 filed Sep. 30, 2010, the disclosure of which are incorporated by reference.

The U.S. Government has a paid-up license in this invention and the right in limited circumstances to require the patent owner to license others on reasonable terms as provided for by the terms of Contract No. awarded by FA8651-09-M-0100.

BACKGROUND

In both the military and commercial market places, there is an ever expanding use of radio-based geolocation/navigation devices (systems and methods described in this disclosure can be applied to both geolocation and navigation and are used interchangeably). Though they generally perform satisfactorily, in virtually every application there are instances where degraded accuracy or non-availability create dangerous situations. For military applications, degraded positional accuracy due to jamming can affect the safety of troops or the navigation precision of a guided weapon. For commercial applications, the non-availability of GPS service inside a building can delay the arrival of emergency personnel to a 911 caller in distress.

Historically, much research has been done to improve the performance of GPS user equipment, yielding great gains in positional accuracy and availability. These activities have principally focused on improving the traditional functions in user equipment such as receiver sensitivity, reference oscillator stability, correlator speed, and signal processing algorithm performance. To create opportunities for future large gains in performance, new approaches and algorithms will need to be applied to user equipment including aiding using other RF signals of opportunity. Therefore, this disclosure represents a means to provide large gains in geolocation and navigation performance vs. diminishing incremental benefits from traditional GPS user equipment research topics. The goal is to be able to maintain the same level of accuracy as a GPS in GPS-denied environments, without adding significant system complexity, cost, or operational burdens. These gains can benefit the growing markets and applications in both the military and commercial sectors.

The use of Signals of Opportunity (SoOPs), such as TV broadcasts and satellite-based communications networks present a very promising solution toward providing a ubiquitous navigation solution in all environments. There are a plethora of RF signals that easily penetrate into what are considered to be GPS-obstructed or impaired scenarios, where impairment is due to either due to signal path loss or jamming. Some of these SoOPs are not only very high power relative to GPS, but offer excellent time resolution to enable precision location due to wide transmission signal bandwidth. It is fairly straightforward to see how through the use of many of these signals, there is a tremendous potential toward a robust and essentially jam-proof navigation solution. There are, however, some associated challenges. Two candidate methods for location and navigation are obvious choices: timing measurement based systems, and signal power level based measurement systems.

With respect to timing measurements, most SoOPs are RF signals whose purpose are not for navigation, but for information transmission, and may therefore not be well suited for use in geolocation/navigation without addressing their deficiencies. For example, most SoOPs are not synchronized to a common time source, as this may not be a requirement for their intended use. Without a timing reference, a measured time of arrival is not a useful measurement unless it can be paired with a time of transmission from which a propagation distance can be derived. Time of transmission, in this context, is the precise time at which a SoOP radiates through the transmit antenna. Time differences (leading to hyperbolic surfaces of position) between multiple observed SoOPs are also not useful unless the transmit timing relationship between the SoOPs is either known or derived through measurements made at known locations. Most SoOPs operate with low stability reference oscillators, which enable low-cost communications, but pose a challenge when used for navigation. Furthermore, many SoOPs may not even be digital signals and are therefore more difficult to use for navigation. These, and other factors, pose serious technical challenges for using SoOPs in precision navigation.

As stated previously, power-based measurements are also possible on SoOP sources. Some commercial success has been experienced using measured power levels of SoOPs such as cellular phone and WiFi for location estimation. These techniques are suitable for areas in which there is a very high density of cell towers or access points relative to the area in which location is to be estimated. For high-precision systems, the navigation coverage area must be extensively calibrated prior to use and is therefore not considered to be a viable candidate technique for broad area navigation and geolocation. Another method uses an even simpler mechanism whereby coarse coverage areas are measured through drive testing and mapped by what WiFi access points are visible as a function of position (such as Skyhook Wireless). This technique has several significant weaknesses that disqualify it for use as a candidate solution as a high precision solution. Drive testing is not considered to be a viable requirement due to the immense operational burden is carries. Furthermore, the accuracy of such a solution is generally on the order of the coverage footprint of the WiFi access point which could be on the order of tens to hundreds or meters or more, which exceeds the target goal of GPS-grade accuracy. If no access points are detected (WiFi is not even close to providing ubiquitous worldwide coverage) then the method will not work at all. Access points, while intended for fixed use, can be easily moved, replaced, or disabled, and make for an unreliable signal source if the surveyed positions are critical to the solution. Other WiFi positioning systems that have been explored are location through the built-in ranging mechanisms within the WiFi protocol. Specifically, range determination is made through calculation of the mean round trip time delay of packets in the data/acknowledgement sequence. Academic researchers have reported promising results using unmodified WLAN chipsets, however questions remain as to how sensitive the techniques are to different manufacturers and performance in high multipath areas.

A significant amount of prior art exists around the fields of geolocation and navigation. Prior art inertial measurement systems thoroughly describe using mechanical methods, often called "dead reckoning", to position and navigate. Devices such as gyroscopes, wheel encoders (odometers), and accelerometers (collectively referred to as inertial measurement units (IMU)) have been used, and generally operate by determining a position relative to a known location or starting point as a body moves over time. An IMU typically consists of accelerometers to measure local accelerations and gyros to measure local rotation rates. The IMU position and velocity is obtained by integrating the IMU measurements. Strapdown micro-electro-mechanical sensor (MEMS) IMUs are particularly attractive due to their size weight and power. MEMS IMUs are electrically driven, miniature mechanical structures produced by micro-machining techniques. In the case of silicon-based MEMS, the micro-machining is performed using standard integrated circuit (IC) fabrication techniques. In this way silicon-based MEMS fully leverage the existing IC industry, enabling the mass production of precision devices.

It is important to understand the units used to express the error terms in these inertial measurement devices. For example, accelerometer errors are expressed in Random Walk Units, such as acceleration per square root frequency or velocity per square root time. A Random Walk Error expressed in m/s per $\sqrt{hour}$ can be converted to $m/s^2$ per $\sqrt{Hz}$ by dividing it by 60.

$$1 \frac{m/s^2}{\sqrt{Hz}} = 1\sqrt{\frac{m^2/s^4}{1/s}} = 1\sqrt{\frac{m^2/s^2}{s} \times \frac{3600\ s}{1\ hr}} = 60 \frac{m/s}{\sqrt{hr}} \quad [1]$$

Similarly Gyroscope Random Walk Errors are generally expressed in the form of angular rate per square root frequency or angle per square root time. Converting from deg/$\sqrt{hour}$ to deg/s per $\sqrt{Hz}$ simply requires dividing it by 60. It is important to note that as sample rate increases, the error decreases. Also, in addition to Random Walk Errors, another term used to characterize IMU performance is noise. These errors are represented in the equation below:

$$g_r = r + c_r + b_r + w_{gyro} \quad [2]$$

Where $c_r$ is the constant offset, r is the rotational rate, $b_r$ is the walking bias, and $w_{gyro}$ is the wideband sensor noise. Left unbounded, internally generated errors will eventually accumulate and degrade the navigation performance of all IMUs to a level that is unusable for high accuracy navigation and position. There is also a large variation in performance of IMUs depending on their target application. For example, FIG. 1(a) shows the position error of a tactical IMU as a function of time and FIG. 1(b) shows the position error of a consumer grade IMU as a function of time. In terms of longitudinal error, the consumer grade IMU demonstrates over thirty times the error when compared to the tactical grade IMU over the same period of time.

For this reason, IMUs are best used in conjunction with other measurements sources that have independent error sources, and offer a way to correct the IMU through measurement of absolute position in order to bound the IMU error build up. The use of algorithm techniques such as Kalman filtering provides a convenient and robust way of fusing these disparate measurement sources together to construct an optimized navigation model.

Another well-known field in geolocation and navigation is radio-waved based and includes radio direction finding and geolocation (time difference of arrival, time of arrival, received power level, etc.) using positioning-specific RF sources such as the earth's magnetic field, LORAN, GPS, and GNSS.

The Global Positioning System (GPS) is an excellent example of radio-based geolocation. It provides for worldwide availability and precision geolocation when a clear view to the sky is available. However, due to limited transmitter power and the extremely long propagation distance between the GPS satellites and users on the earth's surface (ranging approximately 20,192-25,785 km), the received signals are quite weak and pose a significant reception challenge when the signal is further obstructed due to atmospheric loss, building penetration loss and intentional or unintentional interference sources. At the L1 frequency, two types of codes are used: the C/A code and the P code, which can be encrypted by the Y code (referred to as the P(Y) code). In order to compute location, the GPS receiver must first acquire the satellite signals either through the acquisition of the C/A code, or directly through the P(Y) code. In general, it is desirable to use the C/A code for acquisition due to its shorter sequence length and therefore significantly faster acquisition time when the GPS receiver is in what is referred to as a cold-start or start-up from an unknown location and time. In an un-aided mode, the 50 bps navigation data bits must also be recovered in order to decode the required payload of telemetry, ephemeris, and satellite almanac information.

In standalone, un-assisted mode, GPS sensitivity can be addressed in several ways. One way is to increase the antenna gain through larger physical antennas, directional antennas, smart beam-steering techniques, etc. These have disadvantages due to the added size, cost, weight, and power requirements. Other techniques have been developed to improve acquisition and demodulation sensitivity through improved radio components and signal processing advances.

Assisted GPS, or A-GPS was a technique that was propelled into mass use by the US FCC E911 requirement to locate emergency callers from mobile phones. The main principle behind A-GPS is two-fold: to significantly speed GPS acquisition time from a cold-start, and to improve GPS sensitivity in weak signal conditions. Acquisition speed is improved by exploiting a coarse knowledge of the location of the GPS device along with the time of day, to predict what satellite signals should be in view and what their respective code phases and Doppler frequency shifts should approximately be. This results in a dramatically reduced search space for the A-GPS device when attempting to acquire the satellite signals and subsequently reduces the processing time. Improved GPS signal sensitivity is enabled by alleviating the need to demodulate the navigation data. This allows for the computation of pseudo-range estimates from only the acquisition of the C/A code, which requires less received signal strength than if the GPS receiver had to also decode the navigation data payload. Furthermore, longer C/A code integration times, and therefore higher processing gain is achievable when the assistance information forwards the navigation data to the GPS handset. Once the navigation data is known, the phase transitions that occur due to the data modulation can essentially be removed and allow for coherent integration periods that exceed a bit interval. The pseudo-range measurements are fused with atmospheric corrections and the satellite ephemeris, either locally on the GPS receiver or at a remote server, and a high-precision GPS solution is computed.

FIG. 2 shows a diagram of the required infrastructure in a typical commercial wireless A-GPS network. Coarse location is derived from the knowledge of which base station 200 is currently serving the mobile device 210 requesting location service. Based on this coarse location, the appropriate assistance data 220 is routed from the network to the mobile device 210 over the communications link established between the base station and the mobile. Depending on the network configuration, either the mobile or the network can compute the final location.

Radio direction finding and geolocation methods have also been described that use other known non-positioning-specific RF sources but rely on knowledge of the transmitter location and timing relationships between sources. Navigation and geolocation using combinations of RF sources in hybrids where location estimate is based on combining measured surfaces of position are also well-known. Methods and systems removing the limitation of requiring knowing timing relationships between RF sources by adding reference timing stations are also well known. For example, US Pat Pub. No. 2009233621 describes a location method and system that does not require time synchronization between radio sources, but include many limitations on the RF sources, measurements made and inter-element communications channel content. The described methods require that the time of transmission of a radio synchronization signal be transmitted as part of the emission to be received by another element in the system. In other described embodiments, specific relationships exist between system elements (i.e. members of s wireless local area network (WLAN), or transmission of specific synchronization signals). With respect to cellular systems, this application describes a "PhaseNet" approach where requirements are placed on the network elements such as inclusion of special ZT nodes (a type of reference station), being part of the cellular network, use of cellular-specific synchronization signals, known location for the ZT nodes, and others.

Extensions of location methodologies to optical sources (landmarks), including extensions to discovery of unknown optical landmarks and simultaneous location and mapping (SLAM) techniques are also well known.

Another specific set of prior art has been published in US and international patents and patent applications, assigned to Cambridge Positioning Systems including WO2009112293, WO2008119635, WO2007113086 and US Pat. Pub. No. 2005200525. These disclosed methods and systems are directed at cellular systems, share many of the same limitations as US Pat Pub. No. 2009233621, and have further limitations including limitations on handset (user equipment) characteristics.

The use of SoOPs in navigation presents a very promising solution toward providing a ubiquitous navigation solution in all environments. There are a plethora of RF signals that easily penetrate into what is considered to be a GPS-impaired areas, either due to signal path loss or jamming. Some of these are not only very high power relative to GPS, but offer excellent time resolution to enable precision location due to wide transmission signal bandwidth. Based on the prior art, timing measurement based systems, direction finding systems, and signal power level based measurement systems are all potential candidates. However, power level methods are not considered further due to the variability in power levels and the inability of path loss models to provide robust prediction at such fine resolution, both of which lead to very poor accuracy. Even when calibrated over the coverage areas, accuracy improves, yet is considered to be too constraining due to the fact that it may not feasible to calibrate the area in which navigation is required. Direction finding based systems are considered impractical due to the need for line of sight RF signal reception and the difficulties associated with constructing a miniaturized broad bandwidth phased array antenna system. The present disclosure is directed toward the use of timing-based systems for exploiting SoOPs.

A significant amount of relevant prior art also exists in the field of robotic platform simultaneous location and mapping (SLAM). SLAM is a commonly used technique in autonomous robot navigation systems, where the aim is to self-localize a device while concurrently building a map of the environment around it. In the robotics case, the "map" is a field of stationary objects that surround the robot. The robot traverses through this map and attempts to measure range to each object, either through imaging, laser range finding, or ultrasonics, and continuously updates both the location of the detected objects and its own position, or pose, with respect to the objects. Prior art describes research whereby some of the "objects", or landmarks, in robotics terminology are RF SoOPs, from which range can be measured through a receiver placed on the robot, Kurth, D., "Range-Only Robot Localization and SLAM with Radio", Carnegie Mellon University, May 2004. Mathematically, the formulation of this difference lies only in the way the error statistics are modeled within the context of the equations. As an extension of the SLAM navigation concept, Cooperative SLAM, or C-SLAM, is the problem of jointly solving for the location of multiple devices which can communicate with each other who share observation data from SoOP landmarks, detected stationary objects, and of each other.

The basis of SLAM lies in the fundamental theory behind Extended Kalman Filtering (EKF), which is briefly described here. The Extended Kalman Filter linearizes the estimation around the current estimate (similar to a Taylor series expansion) using partial derivatives of the process and measurement functions which are assumed to be somewhat known. The pose at any given time k, is described by the vector $q_k$, which contains the current 2D position as x and y variables, and the heading, or orientation $\theta$.

$$q_k = [x_k, y_k, \theta_k]^T \quad [3]$$

The pose at the next time step k+1 is described as $q_{k+1}$, and is a function of the current state q, a process noise $w_k$, and a forcing function $u_k$. The function mapping the observed measurements to the current pose is described by f, and in the case of the EKF, may be a non-linear process.

$$q_{k+1} = f(q_k, u_k, w_k) \quad [4]$$

The mathematical details behind the EKF are not included in this document, but are readily known by those skilled in the art and is well documented, see Welch, G., Bishop, G., "An Introduction to the Kalman Filter", TR 95-041, UNC-Chapel Hill, Jul. 24, 2006. Instead the discussion is limited to key differences between EKF and C-SLAM. C-SLAM is a fairly straightforward extension of the EKF as described. Now, the state vector is modified to include not only the pose of each device, but the position of each landmark as shown below:

$$q_{k,n} = [x_{k,n}, y_{k,n}, \theta_{k,n}, xl_a, yl_a, xl_b, yl_b, \ldots xl_M, yl_M]^T \quad [5]$$

Where n is the nth device, and the M landmarks are described by $xl_a$, $yl_a$ ... $xl_M$, $yl_M$. The corresponding Jacobian process matrix, another critical distinction between EKF and SLAM is described as:

$$A(k+1) = \frac{\partial h}{\partial q}\bigg|_{q=\hat{q}_k} = \begin{bmatrix} 1 & 0 & -\Delta D_k \cos(\theta_k) & 0 & 0 & \ldots & 0 & 0 \\ 0 & 1 & \Delta D_k \sin(\theta_k) & 0 & 0 & \ldots & 0 & 0 \\ 0 & 0 & 1 & 0 & 0 & \ldots & 0 & 0 \\ 0 & 0 & 0 & 1 & 1 & \ldots & 0 & 0 \\ \vdots & \vdots & \vdots & \vdots & \vdots & \ldots & \vdots & \vdots \\ 0 & 0 & 0 & 0 & 0 & \ldots & 1 & 1 \end{bmatrix} \quad [6]$$

A significant amount of relevant prior art also exists in the field of RF communication systems & platforms. The prior art includes incremental developments and improvements in point to point radio links in terms of reliability and bandwidth, and the progression towards mobile operation. The prior art also describes "infrastructure architectures", where mobile nodes or agents (nodes and agents are used interchangeably in this disclosure) communicate with fixed based stations, best illustrated by current cellular communications networks. The prior art also describes extension to infrastructure architectures called "ad hoc architectures", where nodes communicate directly with each other without the need for base stations. Most recently, a great deal of art has been dedicated to enhancements to ad hoc architectures supporting mobile nodes, and self-organizing/self-healing ad hoc architecture capabilities.

Industry and academic SLAM research has been heavily focused on image processing methods to enable data association for physical object landmark extraction and identification. This is also usually coupled with some sort of ranging mechanism using ultrasonics or laser scanners, and with odometry measurements through optical encoders, inertial navigation sensors, gyroscopes, dead-reckoning, etc. What remains very sparsely researched is the concept of coupling SLAM with radio frequency signals as the ranging measurement source. Entirely absent from any known SLAM research is the concept of using unsynchronized SoOPs paired with SLAM methods in a networked agent scenario.

A significant amount of relevant prior art also exists in the field of software defined radio receivers (SDR) and advanced sensors and platforms. This art describes how a radio receiver can be implemented such that it can be configured to receive and process a wide variety of radio signal types over a wide RF bandwidth in an efficient and cost effective package.

Rapid technological advances have also been made in the area of sensors and platforms, including through increasingly miniaturized electronic components such as MEMS based solid-state gyroscopes, accelerometers, and magnetometers. This technology has been propelled forward by main-stream demands such as the iPhone and household video-gaming controls. Powerful, low-power CPUs with sophisticated power management are fueled by demand for portable computing in smart-phones and laptops. High-density lithium-ion battery technology has been similarly advanced to power these mobile devices. Low-cost CCD cameras are now commodities in most cellular phones and laptops, making imaging technology a possibility for the first time ever for the subject low-cost munitions application. Ultra-compact, low-cost, high-performance multi-band RF transceiver technology has been propelled by demand for high-speed commercial mobile cell phones. Secure, high-speed, IP-based packet data communications have been similarly advanced through a plethora of commodity Wi-Fi enabled devices.

The previously described prior art geolocation and navigation systems and methods use pre-selected RF signal sources with known attributes, locations and relative timing; and they depend on apriori knowledge of existence, attributes and transmitter location of radio signals to be used. Further, they generally operate based on point to point or "infrastructure architecture" communications networks, and utilize conventional receiver architectures and hardware bases. These characteristics limit their ability to utilize the maximum number of measurement sources and measurements which result in a less available and accurate geolocation and navigation solution.

The present disclosure is directed to a novel system and method to allow a more available and accurate geolocation and navigation solution. It utilizes measurements from a heterogeneous mix of apriori known and/or unknown, synchronized and/or unsynchronized, located and/or un-located RF sources (measurements of opportunity), captured by multiple cooperating networked nodes, to render a more robust location solution with respect to availability, accuracy and jamming/spoofing resistance. These multiple agents, by sharing their information, provide an additional source of geolocation information that was not previously available by single agents that may in fact have been able to produce a type of geolocation data. For example, the use of smart phones using the Apple based operating system or the Android based operating system have become ubiquitous. The smart phone platforms may include measurements of barometric pressure to provide an estimate of position along the z-plane as referenced to the individual sensing unit in the smart phone platform, which is notoriously inaccurate due to its reliance on local environmental conditions.

In contrast, by extending the application of the presently disclosed technology, Multiple Agent Simultaneous Location and Measurement (MA-SLAM), to barometric pressure measurements from multiple agents, the inaccuracy of measurements from a single agent can be accounted for and appropriately discounted if necessary.

The use of barometric measurements is known in the prior art. Because the measurement is typically a "relative" barometric measurement are made with reference to a barometric reference standard. Likewise, the use of barometric measurements from mobile devices for geolocation purposes is known in the prior art. However, these prior art systems require that the relative barometric measurements made by the mobile devices be "calibrated" using a dedicated set of fixed reference stations specifically existing for this purpose. These prior art techniques differ from the MA-SLAM techniques disclosed in the present application in several ways. For example, a barometric reference standard is not utilized in determining the barometric measurement for the mobile agent in the present disclosure. In the prior art, fixed reference stations having a known location dedicated to providing a barometric reference were used. In the present disclosure, mobile agents of unknown locations participate when available to provide barometric measurements which can be used with the techniques described in the current application to determine the geolocation of a mobile agent in the z-axis.

DETAILED DESCRIPTION OF THE DRAWINGS

Figure 1A:
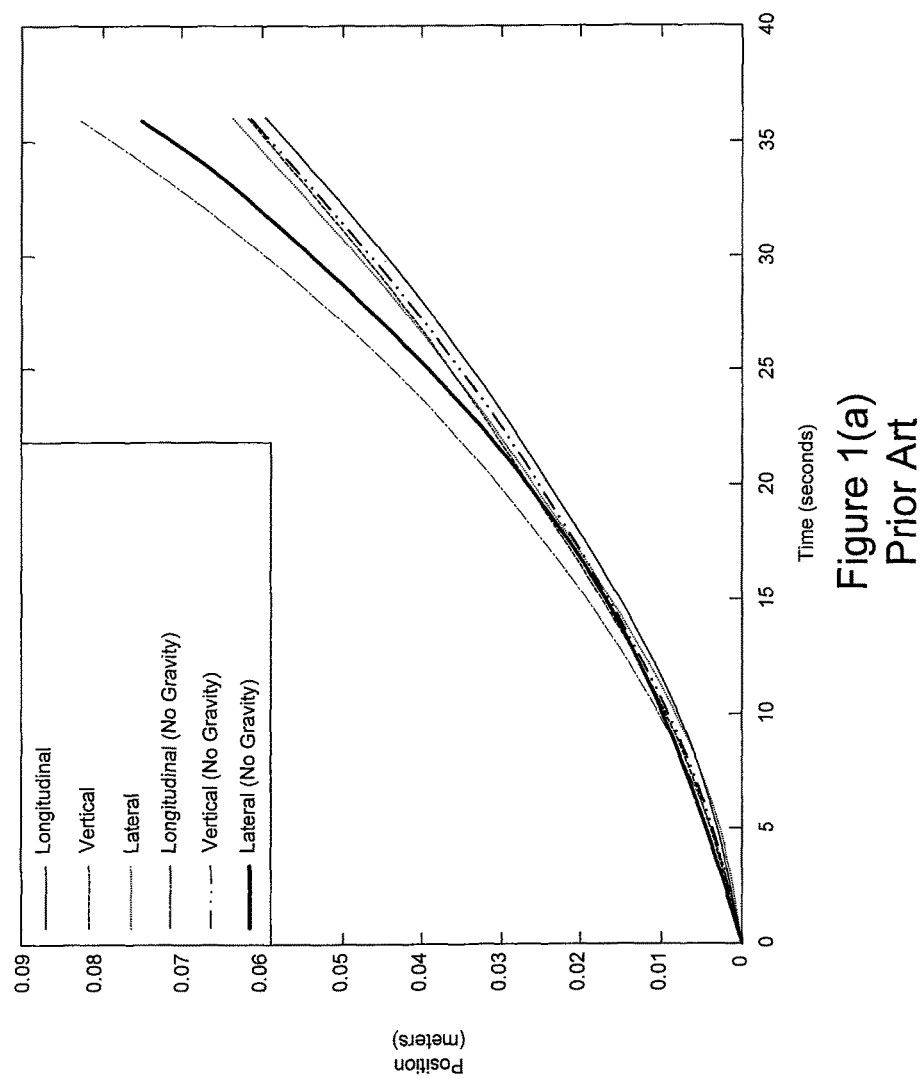
FIGS. 1(a) and 1(b) illustrate the shows the position error as a function of time of a prior art tactical grade IMU and consumer grade IMU, respectively.
Figure 1B:
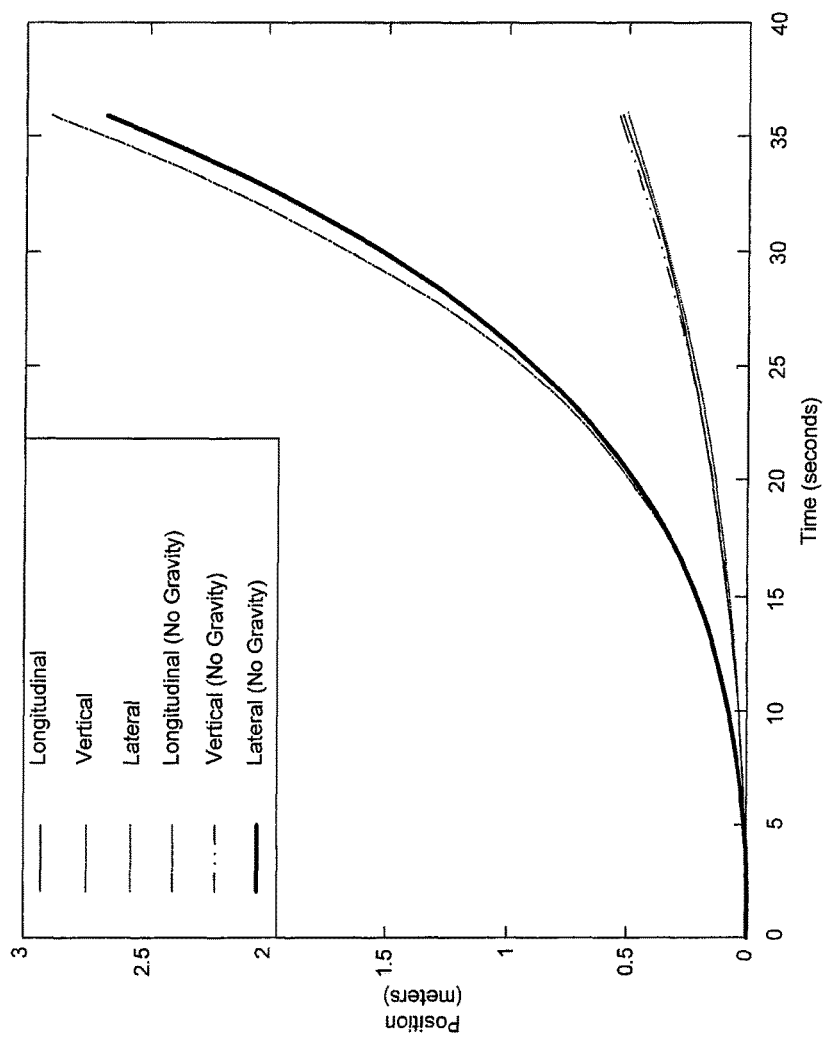
Figure 2:
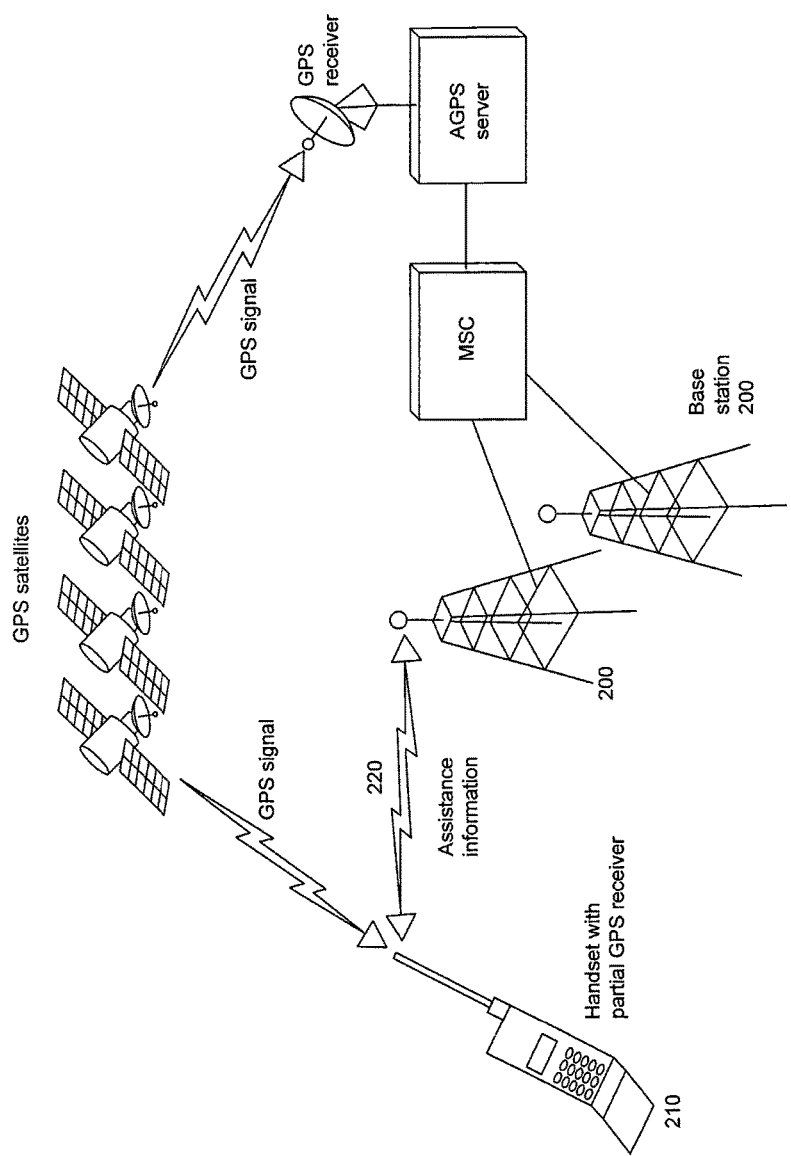
FIG. 2 illustrates a typical prior art architecture for an A-GPS location system.
Figure 3:
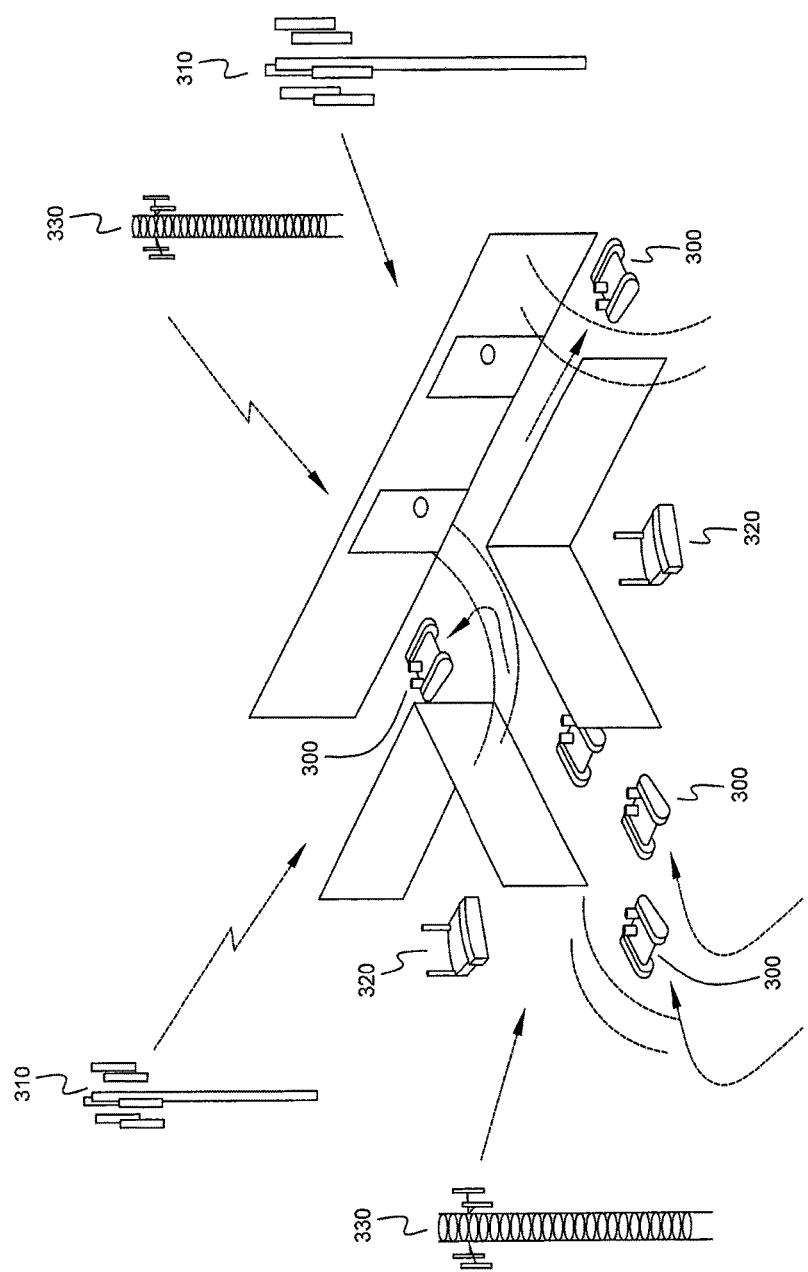
FIG. 3 illustrates a simplified pictorial representation of one example of the present disclosure including small robotic vehicles which can navigate within the hallways of a building by signals of opportunity.

In a preferred embodiment, multiple mobile nodes (agents), equipped with SDR-based receiving assets, and interconnected via a robust ad-hoc wireless network or collaborative server, cooperate to estimate each agent location. Agents discover and make measurements on an arbitrary number of heterogeneous, unknown, unsynchronized and un-located signals of opportunity (SoOPs). As illustrated in FIG. 3, the nodes can include small robotic vehicles 300 which can navigate within the hallways of a building by receiving and processing signals received from cell towers 310, WiFi 320 and TV broadcast SoOPs 330. SoOP existence and measurements are shared between agents to facilitate measurement making and to enable the simultaneous estimation of agent location, SoOP location, and synthetic inter-SoOP timing synchronization.

Figure 4:
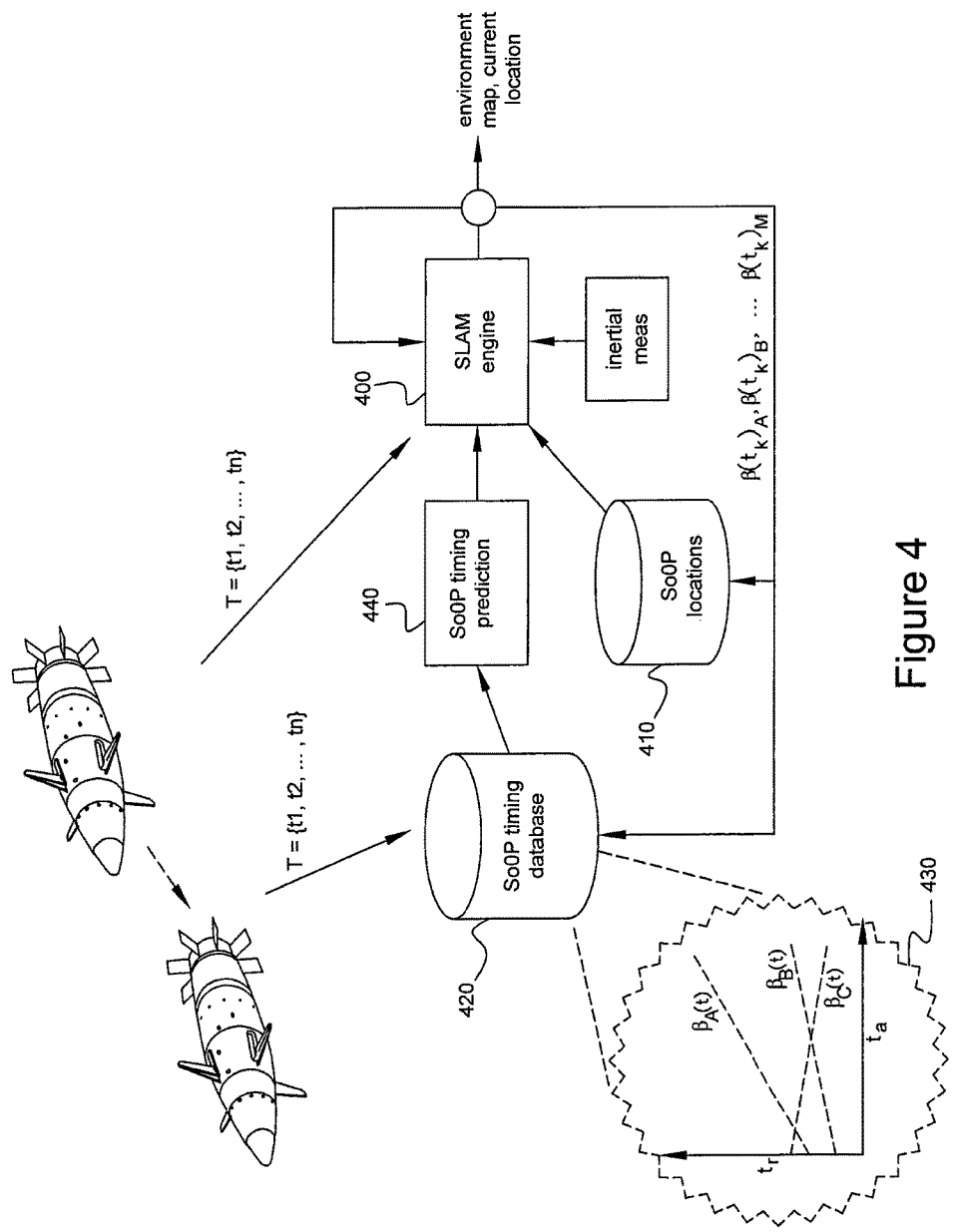
FIG. 4 is a simplified flow diagram showing use of the SMARTS (simultaneous mapping and relative timing using SoOPs) algorithm of the present disclosure.

FIG. 4 illustrates the use of the SMARTS (simultaneous mapping and relative timing using SoOPs) algorithm. Referring to the figure, SLAM engine 400 estimates the location of nodes and SoOP transmitters in an iterative fashion based on the past location of the nodes and SoOPs, current ranging measurements, and current inertial measurements. SoOP locations are stored in D and are either a priori know or estimated over time by SLAM engine 400. A SoOP timing database 420 is maintained which keeps track of the absolute and relative time measurements made on SoOPs at each node 430. The data in SoOP timing data base 420 is used by SoOP timing prediction 440 to synthetically synchronize SoOP timing to allow accurate ranging to be estimated and used in SLAM engine 400. The discovery and identification of the SoOPs can use characteristics of the SoOP in the physical plane, control plane or user plane, including specific emitter information (SEI). The SoOP transmissions can also include MIMO transmissions for a single physical SoOP. The SoOPs can include femotocells, repeaters, in-building distributed antenna systems (DAS) and proximity or time-aiding beacons. These SoOPs are especially useful for indoor location applications. The interconnecting wireless network can include the WiFi standard or cellular radio standards such as GSM and UMTS using either the control or user plane. The transmitting end of the wireless communications link can also serve as a SoOP.

In one preferred embodiment, the SMARTS algorithm includes extending cooperative SLAM algorithms to include RF sources vs. optical sources, range differencing in addition to, or replacing range measurements, and/or timing synchronization-related measurements using both unsynchronized and synchronized SoOPs; and/or use of a synthetic aperture using moving agents.

In another preferred embodiment, aiding information is interchanged between agents to improve, among other things, integration time where aiding information is in the form of demodulated bits, frame/slot timing, synchronization/other repeated sequences, frequency offsets, and timing relative to a common standard.

In yet another preferred embodiment, a cooperative SLAM algorithm includes use of available mechanical measurements in the solution.

In another preferred embodiment, one agent makes SoOP measurements over time to form a synthetic aperture for populate the SLAM equations and calculate geolocation-related estimates.

In another preferred embodiment, the system does not include any timing reference stations, or other additional infrastructure nodes.

In another preferred embodiment, the system does not place any restrictions on the types of SoOPs to be used in the navigation or geolocation solution.

In SLAM, many implementations revolve around the Extended Kalman Filter (EKF), or variations of EKF. In the present disclosure, EKF can be utilized, but range differencing rather than ranges is applied. Range differences vs. ranges simplify the solution with SoOPs as measurement sources and provides the following benefits:

Eliminates the need to solve for the unknown time bias that exists within each agent when it computes arrival time of the SoOPs. (It is anticipated that each agent will make time of arrival measurements of SoOPs at substantially the same time, such that the time drift between each SoOP measurement is negligible); and Eliminates the need to compute an absolute time of transmission for each SoOP. In order to accurately estimate one-way propagation range from a SoOP to an agent, the difference between the estimated time of transmission and time or receipt must be used.

As an example, suppose 20 agents were to track 10 SoOPs. With range measurements, there would be 90 variables to solve for. Using range difference measurements, there would be 69 variables to solve for—roughly 27% fewer variables. This leads to a more robust system with faster convergence, and fewer computational requirements In the present disclosure, SLAM and Cooperative SLAM can be based on the multi-agent EKF problem, or some variation of EKF. SLAM adds to EKF the additional problem of not only solving for the agent pose, but also for the positions of the detected landmarks (whether these are SoOP landmarks or detected stationary object landmarks). This new state model is written as:

$$q_{k,n} = [x_{k,1}y_{k,1}, \theta_{k,1}, \ldots x_{k,N}, y_{k,N}, \theta_{k,N}, xl_{b1}, yl_{b1}, xl_{b2}, yl_{b2}, \ldots xl_{bM}, yl_{bM}]^T \quad [7]$$

Where n is the nth agent, and the M landmarks are described by $xl_{b1}$, $yl_{b1}$ ... $xl_{bM}$, $yl_{bM}$. The corresponding Jacobian process matrix is now described as:

$$A(k+1) = \frac{\partial h}{\partial q}\bigg|_{q=\hat{q}_k} = \quad [8]$$

$$\begin{bmatrix} 1 & 0 & -\Delta D_k \cos(\theta_k) & 0 & 0 & \ldots & 0 & 0 \\ 0 & 1 & \Delta D_k \sin(\theta_k) & 0 & 0 & \ldots & 0 & 0 \\ 0 & 0 & 1 & 0 & 0 & \ldots & 0 & 0 \\ 0 & 0 & 0 & 1 & 1 & \ldots & 0 & 0 \\ \vdots & \vdots & \vdots & \vdots & \vdots & \ddots & \vdots & \vdots \\ 0 & 0 & 0 & 0 & 0 & \ldots & 1 & 1 \end{bmatrix} \quad [9]$$

Where $D_{bm}$ is the distance between the current position estimate $(x_k, y_k)$ and the mth landmark, or SoOP location at position $(x_{bm}, y_{bm})$.

$$D_{bm} = \sqrt{(x_k - x_{bm})^2 + (y_k - y_{bm})^2} \quad [10]$$

Some other key matrices are modified from the original EKF formulation as follows:

$$H_{k+1} = \beta \frac{\partial h}{\partial q_k}(\tilde{q}_k, 0) \qquad [11]$$

$$= \beta \begin{bmatrix} \frac{(x_k - x_{b1})}{D_{b1}} & \frac{(y_k - y_{b1})}{D_{b1}} & 0 & \frac{-(x_k - x_{b1})}{D_{b1}} & \frac{-(y_k - y_{b1})}{D_{b1}} & \cdots & 0 & 0 \\ \vdots & \vdots & \vdots & \vdots & \vdots & \cdots & \vdots & \vdots \\ \frac{(x_k - x_{bM})}{D_{bM}} & \frac{(y_k - y_{bM})}{D_{bM}} & 0 & 0 & 0 & \cdots & \frac{-(x_k - x_{bM})}{D_{bM}} & \frac{-(y_k - y_{bM})}{D_{bM}} \end{bmatrix}$$

The error covariance matrix P, is similarly extended in order to accommodate the covariance terms associated with the landmarks, now added to the state vector. Initially, the entries for the landmarks are based on the expected variance associated with the uncertainty in the initial position estimates of each landmark.

$$P_k = \begin{bmatrix} \sigma_x^2 & 0 & 0 & 0 & \cdots & 0 & 0 \\ 0 & \sigma_y^2 & 0 & 0 & \cdots & 0 & 0 \\ 0 & 0 & \sigma_\theta^2 & 0 & \cdots & 0 & 0 \\ 0 & 0 & 0 & \sigma_{xb1}^2 & \cdots & 0 & 0 \\ 0 & 0 & 0 & 0 & \sigma_{yb1}^2 & 0 & 0 \\ \vdots & \vdots & \vdots & \vdots & \ddots & \vdots & 0 \\ 0 & 0 & 0 & 0 & 0 & \sigma_{xbM}^2 & 0 \\ 0 & 0 & 0 & 0 & 0 & 0 & \sigma_{ybM}^2 \end{bmatrix} \quad [12]$$

Where $\sigma_x^2$, $\sigma_y^2$, and $\sigma_\theta^2$ are the variances associated in the agent in the x, y, and θ dimensions, and $\sigma_{xb1}^2 \ldots \sigma_{ybM}^2$ are the variances associated with the x and y components of the unknown landmarks 1 through M.

β is a transformation matrix that is introduced to allow for the inclusion of range or range difference measurements to be utilized within the context of the equations. For range measurements, the β matrix is an identity matrix dimensioned by the number of range measurements. For range difference measurements, the matrix is described as:

$$\beta = \begin{bmatrix} 1 & -1 & 0 & \cdots & 0 \\ 1 & 0 & -1 & \cdots & 0 \\ \vdots & \vdots & \vdots & \ddots & \vdots \\ 1 & 0 & 0 & \cdots & -1 \end{bmatrix} \quad [13]$$

Where the number of rows is equal to the number of range measurements −1, and the number of columns is equal to the number of range measurements.

With these matrix changes, the execution for SLAM is the same as what was provided for the EKF. Only now, the state vector will contain estimates of the landmarks in addition to the estimates of the agents. When multiple agents are estimating the states of all the unknown landmarks, robust performance has been observed when all of the landmark estimates from each of the agents are averaged. These averaged estimates are then carried forward to the next time iteration, rather than being applied as each agent computes new landmark estimates. This observation underscores the performance advantage of the cooperative aspect of C-SLAM. That is, the estimates of the common landmarks observed by each agent are combined to provide a more robust estimate of the landmarks, thereby increasing the accuracy of the landmark position estimates, and lowering the corresponding uncertainty.

The present disclosure may also use inter-agent aiding information. Inter-agent aiding information consists of reference data to be shared between agents to extend the length and/or accuracy of the RF source data to be used in the Extended Cross Ambiguity Function (E-CAF). The E-CAF can be mathematically described by:

$$A(\tau, f) = \left(\frac{1}{T}\right) \int_0^T x(t) y^*(t-\tau) e^{-j2\pi ft} \, dt$$

Figure 5:
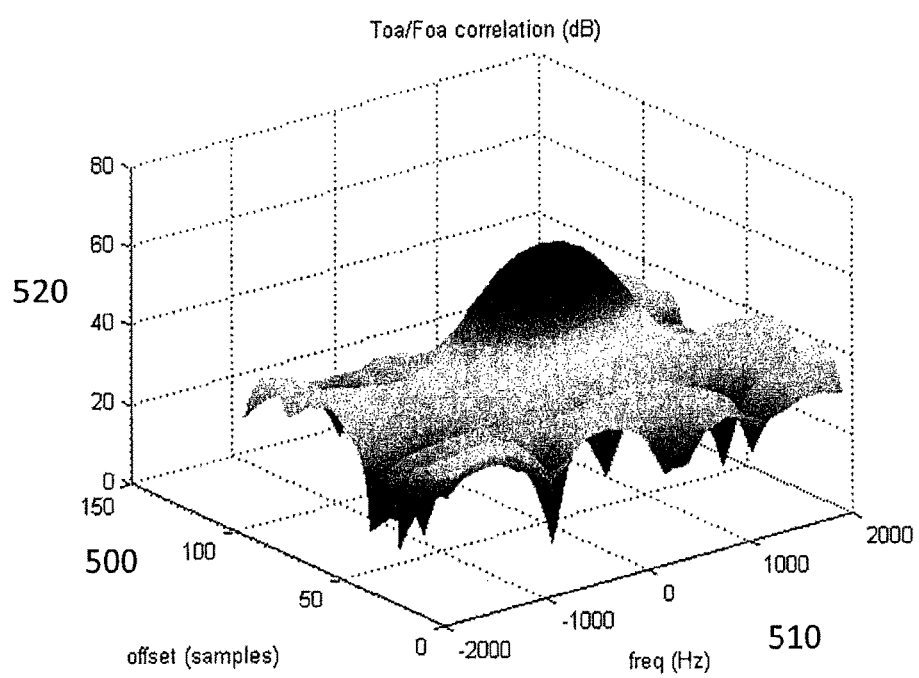
FIG. 5 is a simplified graph of an the use of the extended cross ambiguity function of the present disclosure to generate a space-time-frequency plot of a SoOP.

The variable T references the coherent integration period, $x(t)$ represents the digitized signal from one sensor, and $y(t)$ represents the digitized signal from either a second sensor or from a locally generated reference waveform. An example plot generated from the E-CAF is shown in FIG. 5, where time (offset) 500 and frequency 510 are on the x and y axes, and correlation power 520 is on the z axis. Through aiding data, one can significantly lengthen signal duration and achieve higher sensitivity and thus acquire more SoOP measurements. Furthermore, aiding data in terms of bounding the time and frequency search windows lowers computational requirements, thus increasing speed, and allow signal detection thresholds to be reduced while maintain the same probability of false alarm rate. Fewer trials will be made in order to test for detection, therefore, the probability of a false detection reduces as the number of trials reduces. One may take advantage of this reduction, by lowering the detection threshold to the point where the original probability of false alarm rate is maintained, while increasing the probability of detection.

Figure 6:
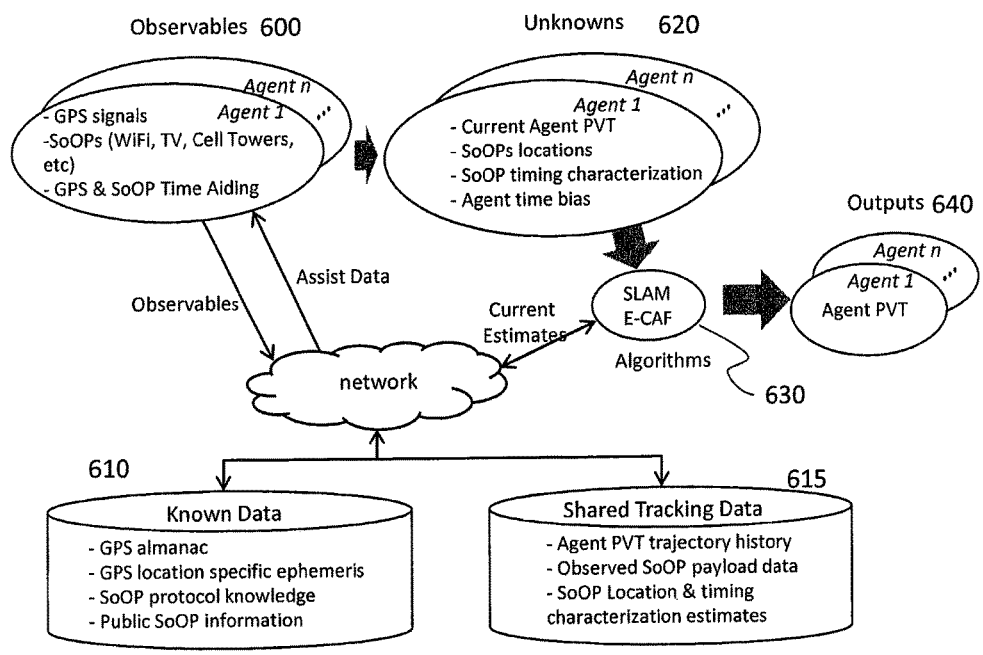
FIG. 6 is a simplified flow diagram of the hybrid iterative GPS/SoOP solution (HIGSS) algorithm described in the present disclosure.

Another preferred embodiment provides the ability to simultaneously compute position, time, time bias, SoOP timing relationships and drift rates, and SoOP positions in the absence of other aiding data such as inertial instrumentation or reference timing stations through the Hybrid Iterative GPS/SoOP Solution (HIGSS) algorithm. With reference to FIG. 6, in this embodiment, GPS satellite transmissions are used as another SoOP source. The approach provides a technique for synthesizing and disseminating acquisition assistance data for GPS-sourced measurements, as well as for the acquisition of SoOPs. This is particularly useful for increasing the number of available SoOPs used for GPS position and timing aiding as a result of the resulting sensitivity improvement.

Referring to FIG. 6, a set of observable measurements 600 from one or more agents contains one or more of the following: (a) observed GPS pseudo-ranges, (b) observed SoOP times of arrival from SoOP sources such as: WiFi access points, cell towers, WiFi transmissions from nearby agents, TV stations, mobile wireless devices, AM/FM radio, etc. (c) GPS & SoOP aiding data which contains known data. The known data 610 can include (a) GPS almanac, ephemeris, and navigation data, (b) if coarse location is known, specific Doppler and time search windows for each GPS satellite, (c) known and measured SoOP information such as cell tower data payloads from broadcast signals as measured by other agents or derived through a-priori public information, (d) current SoOP relative timing estimates. Known tracking information 615 shared by other agents can also be used to enhance sensitivity and acquisition speed of an agent. The shared tracking data may include (a) PVT information for an agent, (b) observed SoOP payload data and (c) SoOP location and timing characterizations estimates. The unknowns 620 that must be continuously solved for and tracked by all agents are the following: (a) current agent PNT (Position, Navigation, Velocity), (b) locations of SoOPs (if not known a-priori), (c) SoOP timing characterizations, as estimated through observations over time (this may include relative SoOP timing relationships, relationship to absolute GPS time, and characterization of time drifts), (d) the time bias that exists within each agent due to local oscillator error.

The Extended Cross Ambiguity Function (E-CAF) technique 630 is used to efficiently provide time and frequency estimates of GPS and SoOP signals, with significantly increased sensitivity due to deep integration and narrowed time and frequency search windows enabled through the aiding data.

Simultaneous Location and Mapping (SLAM) 630 is used to fuse all new measurements with the current SoOP timing relationships, SoOP locations, and agent time bias estimates with the current state estimates in the context of a non-linear recursive model. In the case of a single agent, synthetic position aperture is obtained by an agent which moves throughout an area.

In HIGSS, the output 640 of the navigation algorithms will be a set of state estimates of each agent in terms of PNT. Significant efficiency and robustness is achieved by distributing the measurements and state estimates of all the unknown variables associated with each agent in the system if more than one exists. This information is retrieved from each agent through a wireless backhaul connection and disseminated to all other agents working cooperatively in an area. When multiple agents can make observations against commonly observed SoOPs, the problem dimensionality becomes increasingly over-determined, and allows for rapid solution convergence and higher navigation accuracy.

One key aspect of the proposed solution lies in the ability to exploit known information not just from GPS such as almanac, ephemeris, and navigation data, but from SoOPs as well. Exploiting the known protocol structures of the SoOPs creates a significant advantage when attempting to acquire weak or partially blocked signals. For example, if one agent is able to successfully acquire, demodulate, and identify a WCDMA base station, one can exploit knowledge of the protocol to predict when the same information will appear in near-term broadcast transmissions. Disseminating this information to other agents will allow much longer coherent integration times and reduced range and Doppler search windows which enhance sensitivity and acquisition speed.

In one embodiment, the following specific algorithm components can be invoked as a function of the number of available networked agents (if any) and the availability of SoOP location knowledge.

|  | Single Agent | Multiple Agents not within communications range of each other | Multiple Agents within communications range of each other |
| --- | --- | --- | --- |
| All SoOPs in known locations | (A) Use HIGSS technique to estimate PNT by moving AGENT throughout area to create synthetic aperture. Continuously update SoOP Timing Model. | (B) Use HIGSS technique to estimate PNT of all AGENTs. Inter-AGENT dissemination of measurements through WiFi connection to remote server through WiFi AP. Server disseminates measurements to AGENTs. Use HIGSS technique to estimate PNT on all AGENTs. Continuously update SoOP Timing Model. | (C) Same as (B), but SoOP timing model parameters are passed through an ad-hoc WiFi connection between AGENTs. Also, include the AGENT WiFi transmissions as candidate SoOPs. |
| Some or all SoOPs in unknown locations | Same as (A), but augment with SLAM to compute PNT of the AGENT in addition to solving for SoOP locations timing model estimates. | Same as (B), but augment with C-SLAM to compute PNT of the AGENT in addition to solving for SoOP locations timing model estimates. | Same as (C), but augment with C-SLAM to compute PNT of the AGENT in addition to solving for SoOP locations timing model estimates. |

Another preferred embodiment of the invention provides the ability to provide signal integrity validation. In the case of GPS signals this means the ability to detect false GPS signals (i.e. spoofing signals). The approach uses the ability of the agents to measure and decode ambient SoOPs, many of which convey public information on the identity, time of day, country, network ID, etc, to which the signals belong. This decoded information can be used to cross-check information recovered from GPS to look for inconsistencies that could indicate that GPS is being compromised. It would not be feasible for a spoofing system to spoof every available SoOP in the vicinity of the spoofing target, making this approach extremely robust. For example, in the 3GPP GSM specification, which describes the dominantly used commercial cellular protocol in the world, all broadcast channels (BCCH) on each sector of each base station transmit the unique identify information known as the CGI, which is composed of the following components: Mobile Country Code (MCC) which identifies the country in which the GSM PLMN is located, Mobile Network Code (MNC) is a code identifying the GSM PLMN (Public Land Mobile Network) in that country, Location Area Code (LAC) which is a fixed length code (of 2 octets) identifying a location area within a GSM PLMN.

Figure 7:
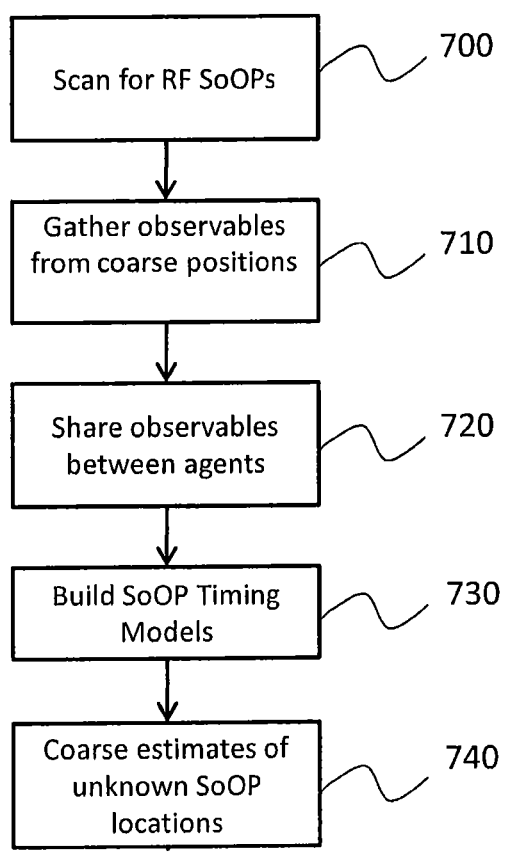
FIG. 7 is a simplified flow chart of the initialization phase of the present disclosure.

FIG. 7 illustrates one embodiment of the initialization phase to establish coarse initial location estimates of the SoOPs, and the relative timing offsets, some of which are unknown. As used in this disclosure, a "coarse location or "coarse position" means the best estimate available, which is usually derived from a priori knowledge, and has an accuracy of 100s to 1000s of meters which is unsuitable for precise positioning, while the term "location determined from the ranging measurements disclosed in the present disclosure typically have an accuracy of 1's to 10's of meters and are generally suitable for precise positioning. Agents start from some initial coarse location, designated as the origin or reference point going forward for the construction of the map. This can either be absolute location, or a relative location. For example, the initial position could be a place in which very high quality GPS-only location has been obtained by one or more of the agents. In step 700, agents scan for and measure available SoOPs and decide on which set to use navigation. Which SoOps to use can be based on first classifying the SoOPs and then ranking the SoOPs in order of preference. For example, some SoOPs provide better location information than others. A SoOP transmitted from a transmitter having a known location is preferred over a SoOP originating from a transmitter having an unknown location. SoOps having larger bandwidth and higher power are preferred over signals having narrow bandwidth or lower power. Signals having a smaller geometric dilution of precision (GDOP) are preferred over signals having a larger GDOP. The agents can be synchronized to each other, synchronized to a common reference, or do not need to be synchronized at all.

In step 710, the agents having a coarse location gather observables from SoOps. The observables may be ranging measurement and can be derived from timing, power and range information. Agents repeatedly measure relative SoOP relationships over some period of time until the drift rates can be adequately characterized (within some acceptable amount of error). Using a set of agents which are either in motion (as measured by inertial instrumentation), or a set of agents from precise locations, SoOP timing is measured. In Step 720, the SoOp timing measured at an agent can be sent to other agents.

In step 730, the shared observables, including the agent positions as measured by the inertial instrumentation and/or GPS (if available), the observed relative SoOP timing measurements at each position, and the known SoOP timing drift as a function of time can be used to build a set of equations solves for the SoOP positions. These equations can be used to provide an initial position estimate of the SoOPs 740 using a straightforward least squares estimation method (or other method). This initial estimation accuracy will be dependent on the inertial instrumentation error, the accuracy of the SoOP timing characterization, the SoOP timing measurement accuracy, and the relative geometry of the agents to the SoOPs. This step is not considered SLAM yet, as one is only trying to come up with the initial SoOP (or landmark) positions that are needed to initialize the SLAM equations.

Figure 8:
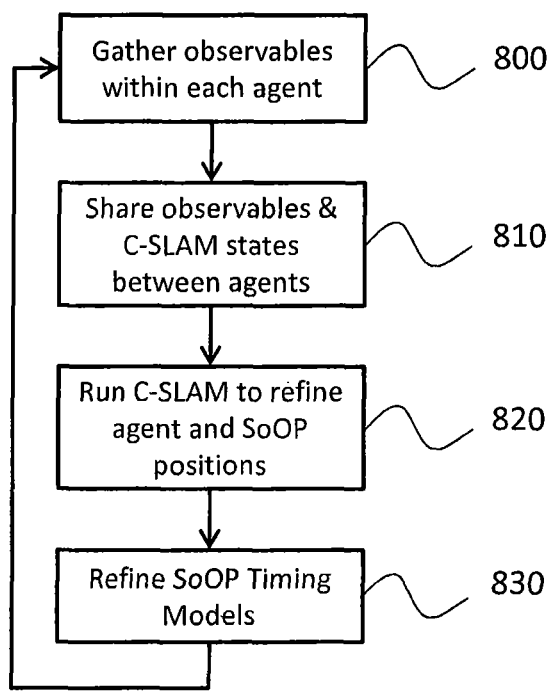
FIG. 8 is a simplified flow chart of the mapping phase of the present disclosure.

After initialization, the information collected can be utilized to perform a mapping phase and ultimately refine the location of the agents and the SoOPs. With reference to FIG. 8, one embodiment of the present disclosure can be utilized for extended period navigation in GPS-denied areas. This phase commences when the agents have completed the initialization phase and are maneuvering into an area of interest that is GPS-denied, such as an indoor area. Given the initial landmark estimates, SLAM equations can be constructed, which now allow for a refinement of the SoOP positions using imperfect inertial measurements, and are augmented by the inclusion relative SoOP timing estimates, SoOP range-difference measurements, and the inter-agent ranging measurements. Like in the initialization phase, in step 800 the agents gather observables, Inter-agent ranging measurements may serve as a source for additional positioning information, and as a means to correct and bound odometry measurements. Alternatively, the agents could use range-difference measurements against other agents, where all agents attempt to locate each other while transmitting communications signals. The agents continuously make ranging measurements such as SoOP timing, inertial, inter-agent ranging, and GPS. In step 810, agents continuously share their own ranging measurements and pose estimates through some communication means. In step 820, these measurements are coupled with the dynamic SoOP timing models, and are used in the set of C-SLAM equations which will refine SoOP emitter location estimates and agent position estimates. Step 830 is an alternative step in which the SoOP timing models can be also be updated as a function of output of the SLAM states, or the SLAM equations could be further modified to integrate the SoOP timing model tracking function jointly within the same set of equations.

The present disclosure describes agents that make and process measurements towards the goal of estimating geolocation and navigating. Each agent can be an RF receiving/processing element that can be aware of its operating environment and its own receiving and processing resources. The geolocation or navigation performance goal can vary (for example, desired geolocation accuracy, or position update rates) based on the physical attributes of the agent and intended application. Given these conditions, in another preferred embodiment, an agent or group of agents can autonomously and intelligently adapt internal processes based on environment sensing, towards the goals of desired geolocation and navigation performance, and resource efficiency.

Thus, SLAM is the computational technology solution for constructing or updating a map of an unknown environment while simultaneously keeping track of an agent's location within it. Multiple Agent SLAM ("MA-SLAM") applies the same techniques to multiple agents to be located or participating in the location problem.

Obviously, receiving information from multiple agents whose location is known facilitates the location of a mobile agent of unknown location, However, there are known algorithms for solving it, at least approximately, in tractable time for certain environments, the location of multiple agents of previously unknown locations using parameters measured by the multiple agents. As discussed previously, popular approximate solution methods include the particle filter and extended Kalman filter. SLAM algorithms are tailored to the available resources, hence not aimed at perfection, but at operational compliance. Published approaches are employed in self-driving cars, unmanned aerial vehicles, autonomous underwater vehicles, planetary rovers, newly emerging domestic robots and even inside the human body.

In the present case, the sensors that measure atmospheric or barometric pressure may be placed in a smart phone or other portable processing unit. However, because the conventional stand-alone sensors are susceptible to normal environmental conditions, the sensor's ability to adequately determine the location of a transmitter along the z-axis is limited without reference to an accurate base standard.

By its nature, the barometric or atmospheric measurement is a relative measurement. However, as discussed previously with respect to timing and conventional geolocation techniques, the use of MA-SLAM advantageously allows the use of relative measurements where any inaccuracies associated with the underlying measurements are effectively canceled out.

Using barometric sensors in smartphones is only a rudimentary measure which may provide a location along the z-axis, but the accuracy is not sufficient in a reasonable determination of location. The present disclosure is directed to a sensor having the technology to measure an atmospheric or barometric condition, and sharing the measurement with multiple agents such that the previously disclosed multiple agent model is able to provide an accurate location of a targeted transmitter including z-coordinates. For example, the use of measurements from barometric sensors of multiple agents fed to a Kalman, or similar type filter, can be used to provide an accurate location of the z-coordinates of the multiple agents.

Figure 9:
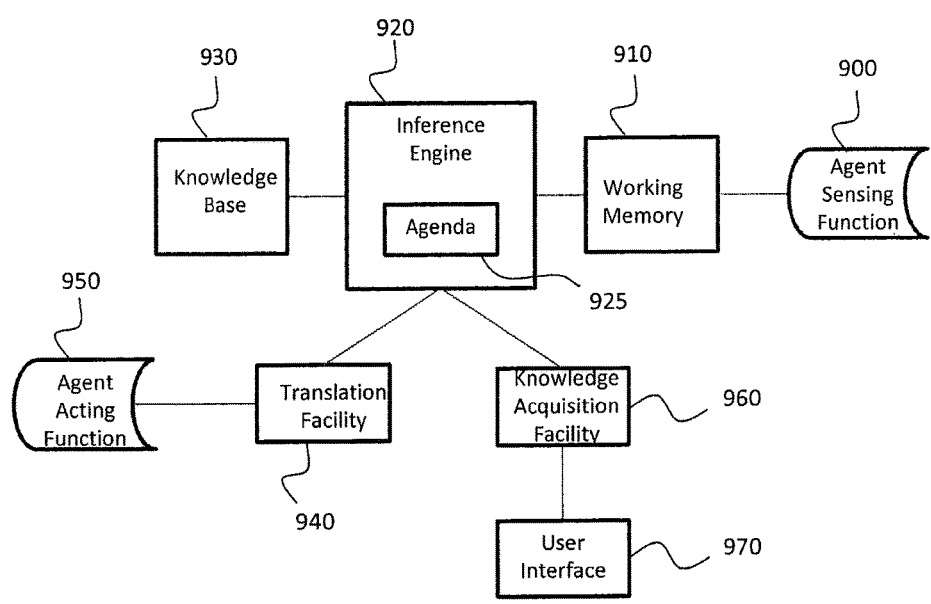
FIG. 9 is a simplified pictorial illustration of one embodiment of the present disclosure implemented in an inference engine directed to a navigation application.

This adaptation can be accomplished through prior art methods and systems. FIG. 9 illustrates a rule based expert system tailored to apply the present disclosure for a navigation application. As shown in the figure, the field of expert systems provides a framework for sensing (shown as Agent Sensing Function 900 and producing "facts" in the Working Memory 910), deciding (testing "rules" with the "facts" using the Inference Engine 920 through rules extracted from the Knowledge Base 930 and scheduled in the Agenda 925) and acting (modifying signal processing steps towards performance goals converted from rule language to action steps in the Translation Facility 940 and Agent Acting Function 950). The Knowledge Acquisition Facility 960 and User Interface 970 are used to input knowledge, including through a graphical user interface (GUI). Working memory is the name used for the function that stores facts. It will contain static and dynamic information ("facts") from a variety of sources including: (a) Application Goals & Objectives, (b) Agent Platform Resources, (c) RF Spectrum and SoOP Conditions, (d) Agent Platform Conditions, and (e) Geolocation and Navigation Performance Conditions.

Different application goals and objectives will drive operation of the agent. Application goals and objectives will need to be translated into facts that can be used by an inference engine (see FIG. 9). For example, a missile guidance mission translates to the need for very high accuracy location (targeting) with a very high update rate (high velocity platform) while working on a host platform with ample prime power (generator vs. battery powered) in open sky conditions. In contrast, a mission where a soldier parachutes into hostile territory to provide long term surveillance translates to the need for moderate accuracy (what city block/building am I in), low update rates with high latency (little movement at walking speed), long battery life and non-line of sight propagation conditions. At a high level, application goals and objectives must be translated into duration, required accuracy, update rate, latency, power consumption and RF operating environment facts.

Agent platform resources includes the hardware and software resources in the agent platform including RF circuitry, digital signal processing circuitry, power conditioning and management circuitry, battery capacity, and functional and housekeeping software processes. Characteristics for each of these categories must be included such as power consumption, degree to which it can be controlled, process performed, etc. With respect to functional software resources, the available signal processing tools and where they can be applied in the signal processing flow is part of this category.

Spectrum conditions refers to measurements made at the physical or measurement layer that indicate the propagation and interference conditions in operating band. These could include presence of SoOPs, signal attenuation beyond LOS, presence of narrowband or wideband interferers, presence of multipath and characteristics, presence of spoofing signals, etc.

Agent platform conditions refers to the current configuration and condition of the host platform. Remaining battery power and current draw are examples of platform conditions. Current signal processing flow is another example.

Geolocation and navigation performance conditions refers to the current position, velocity and time accuracy as measurable in the agent/agent group. These measurements are available from the application layer of the agent. This category may include an estimation of spoofing activity/effects.

The present disclosure can be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Those skilled in the art will appreciate that the present invention can be practiced by other than the described embodiments, which are presented for the purposes of illustration and not of limitation, and the present invention is limited only by the claims which follow.

What is claimed:

1. A method of locating a mobile agent along a z-axis in a multiple agent environment wherein each agent includes a barometric sensor, comprising the steps of:
   in a processor, receiving a first barometric measurement from a barometric sensor associated with a first mobile agent wherein a barometric reference station is not utilized in determining the first barometric measurement for the first mobile agent;
   in the processor, receiving a plurality of second barometric measurements from a plurality of second mobile agents, each of the second mobile agents having a barometric sensor wherein a barometric reference station is not utilized in determining the plurality of second barometric measurement for the first mobile agent;

using a filter in the processor to process the first barometric measurement and the plurality of second barometric measurements to determine a third barometric measurement for the first mobile agent, wherein a barometric reference station is not utilized in determining the third barometric measurement for the first mobile agent;

in the processor, converting the third barometric measurement for the first mobile agent to an estimated elevation of the first mobile agent; and at the first mobile agent, surveying the radio frequency (RF) environment by monitoring a range of RF frequencies;

receiving a plurality of RF signals of opportunity (SoOP) wherein the RF SoOP is an ambient radio frequency transmission that is not intended for navigation, position or timing for positioning purposes;

performing ranging measurements on the received SoOPs signals; and determining a location of the first mobile agent as a function of the performed ranging measurements and estimated elevation of the first mobile agent.

2. The method of claim 1 wherein the filter is a Kalman filter.

3. The method of claim 1 wherein at least one of the received RF SoOPs is transmitted from a first transmitter of unknown location and further comprising the step of:
determining a location of the first transmitter as a function of the received RF SoOPs.

4. The method of claim 1 wherein the step of performing ranging measurements includes determining the time difference of arrival of signals from at least two transmitters.

5. The method of claim 1 wherein the plurality of received SoOPs includes two different signals selected from the group of a WIFI signal, a WIMAX signal, a cellular signal, and a digital television signal.

6. The method of claim 1 wherein the performed ranging measurements are sent to a distributed platform, and step of determining a location of the mobile agent as a function of the performed ranging measurements and estimated elevation of the first mobile agent is performed at the distributed platform.

7. The method of claim 1 wherein the receiver does not have a priori knowledge of the plurality of received RF SoOPs.

8. A system for locating a mobile agent along a z-axis in a multiple agent environment wherein each agent includes a barometric sensor, comprising the steps of:
a first mobile agent having a barometric sensor;
a plurality of second mobile agents, each of the plurality of second mobile agents having a barometric sensor;
a memory for storing computer readable code;
a processor operatively coupled to the memory, the processor configured to:
(i) receive a first barometric measurement from a barometric sensor associated with a first mobile agent wherein a barometric reference station is not utilized in determining the first barometric measurement;
(ii) receive a plurality of second barometric measurements from a plurality of second mobile agents wherein a barometric reference station is not utilized in determining the second barometric measurements;
(iii) apply a filter function to the first barometric measurement and the plurality of second barometric measurements to determine a third barometric measurement for the first mobile agent, wherein a barometric reference standard is not utilized in determining the third barometric measurement for the first mobile agent; and
(iv) convert the third barometric measurement for the first mobile agent to an estimated elevation of the first mobile agent;
(v) survey the radio frequency (RF) environment by monitoring a range of RF frequencies;
(vi) receive a plurality of RF signals of opportunity (SoOP) wherein the RF SoOP is an ambient radio frequency transmission that is not intended for navigation, position or timing for positioning purposes;
(vii) perform ranging measurements on the received SoOPs signals; and
(viii) determine a location of the first mobile agent as a function of the performed ranging measurements and estimated elevation of the first mobile agent.

9. The system of claim 8 wherein the processor includes a Kalman filter.

10. The system of claim 8 wherein at least one of the received RF SoOPs is transmitted from a first transmitter of unknown location and the processor is further configured to determine a location of the first transmitter as a function of the received RF SoOPs.

11. The system of claim 8 wherein the processor is configured to perform ranging measurements by determining the time difference of arrival of the received RF SoOPs from at least two transmitters.

12. The system of claim 11 wherein the plurality of received RF SoOPs includes two different signals selected from the group of a WIFI signal, a WIMAX signal, a cellular signal, and a digital television signal.

13. The system of claim 8 wherein the processor is a distributed platform remote from the mobile agents.

14. The system of claim 8 wherein the processor does not have a priori knowledge of the plurality of received RF SoOPs.

15. The method of claim 1 further comprising the steps of:
at the first mobile agent, collecting inertial measurement information for the first mobile agent; and
determining a location of the mobile agent as a function of the inertial measurement information, the performed ranging measurements and estimated elevation of the first mobile agent.

16. The system of claim 8 wherein the processor is located at least one of the mobile agents.

* * * * *